(12) United States Patent
Choi

(10) Patent No.: US 12,039,715 B2
(45) Date of Patent: Jul. 16, 2024

(54) SYSTEM AND METHOD FOR VERIFYING QUALITY USING ARM ROBOT

(71) Applicants: Hyundai Motor Company, Seoul (KR); Kia Corporation, Seoul (KR)

(72) Inventor: Byoung Il Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 389 days.

(21) Appl. No.: 17/545,552

(22) Filed: Dec. 8, 2021

(65) Prior Publication Data
US 2022/0398707 A1 Dec. 15, 2022

(30) Foreign Application Priority Data
Jun. 9, 2021 (KR) ........................ 10-2021-0074849

(51) Int. Cl.
| | |
|---|---|
| *B25J 19/00* | (2006.01) |
| *G06T 7/70* | (2017.01) |
| *H04N 23/695* | (2023.01) |
| *G06T 7/00* | (2017.01) |
| *B25J 15/00* | (2006.01) |
| *B25J 9/16* | (2006.01) |

(52) U.S. Cl.
CPC ............. *G06T 7/001* (2013.01); *B25J 9/1679* (2013.01); *B25J 15/0019* (2013.01); *B25J 19/00* (2013.01); *G06T 7/70* (2017.01); *H04N 23/695* (2023.01); *G06T 2207/30164* (2013.01); *G06T 2207/30244* (2013.01)

(58) Field of Classification Search
CPC . G06T 7/001; G06T 7/70; G06T 2207/30164; G06T 2207/30244; B25J 9/1679; B25J 15/0019; B25J 19/00; B25J 5/02; B25J 13/088; B25J 9/1674; B25J 19/023; H04N 23/695; G05B 2219/32177; G05B 2219/40272; G05B 2219/40613; G05B 2219/45066; B62D 65/005
See application file for complete search history.

(56) References Cited

U.S. PATENT DOCUMENTS

| | | | |
|---|---|---|---|
| 9,187,188 B2 * | 11/2015 | Richter | .................... G06T 7/001 |
| 10,104,863 B1 * | 10/2018 | Henry | .................. B25J 15/0019 |
| 10,475,208 B1 * | 11/2019 | Morrison | ............... G06V 20/52 |

(Continued)

FOREIGN PATENT DOCUMENTS

| | | | | |
|---|---|---|---|---|
| EP | 3904014 A1 * | 11/2021 | ............ | B25J 13/006 |
| WO | WO-2021086327 A1 * | 5/2021 | ............ | B25J 13/085 |

*Primary Examiner* — Sihar A Karwan
(74) *Attorney, Agent, or Firm* — MORGAN, LEWIS & BOCKIUS LLP

(57) ABSTRACT

A system for verifying quality of a part using an arm robot includes an arm robot, which includes a camera to acquire image data of a part assembled in each manufacturing process of a vehicle, a carrier, which includes a sliding rail allowing the arm robot to be movable around the vehicle along the sliding rail to acquire the image data, and a server which receives the image data acquired by the camera, compares the image data with modeling data of the vehicle, which is stored in a database, and determines whether the assembled part satisfies a preset inspection item, to verify quality of the assembled part, verifying the quality of the part in each process before the vehicle is completely manufactured.

19 Claims, 11 Drawing Sheets

(56) References Cited

U.S. PATENT DOCUMENTS

| | | | |
|---|---|---|---|
| 2005/0166413 A1* | 8/2005 | Crampton | G01B 5/008 33/503 |
| 2010/0092273 A1* | 4/2010 | Oda | B25J 9/046 414/728 |
| 2017/0212066 A1* | 7/2017 | Thompson | G06V 10/764 |
| 2019/0176338 A1* | 6/2019 | Zito | G06Q 50/12 |
| 2019/0217477 A1* | 7/2019 | Paepcke | B25J 9/1679 |
| 2019/0330933 A1* | 10/2019 | Mikalsen | B25J 11/00 |
| 2019/0330935 A1* | 10/2019 | Mikalsen | E21B 19/20 |
| 2020/0108659 A1* | 4/2020 | Downey | B25J 9/1697 |
| 2020/0376666 A1* | 12/2020 | Briquet-Kerestedjian | B25J 9/161 |
| 2021/0114408 A1* | 4/2021 | Darolfi | B60B 29/00 |
| 2021/0276799 A1* | 9/2021 | Velagapudi | G06T 7/70 |
| 2021/0278126 A1* | 9/2021 | Ghobadi | B25J 13/006 |

* cited by examiner

[CONDITION 2] CARRIER CURRENTLY
PASSES SPECIFIC VIRTUAL POINT PRESET BY USER?

SYSTEM AND METHOD FOR VERIFYING QUALITY USING ARM ROBOT

CROSS-REFERENCE TO RELATED APPLICATION

The present application claims priority to Korean Patent Application No. 10-2021-0074849, filed on Jun. 9, 2021, the entire contents of which is incorporated herein for all purposes by this reference.

BACKGROUND OF THE INVENTION

Field of the Invention

The present invention relates to a system and a method for verifying quality of a part using an arm robot, capable of monitoring an assembled part of a vehicle.

Description of Related Art

Global vehicle makers have annually produced several millions of cars to several tens of millions of cars, and vehicles having various specifications have been produced to meet various needs of customers.

To manufacture vehicles having various specifications, numerous parts are necessary. The parts may have quality problems due to various causes, such as a problem occurring in a production line of each part, a problem of a delivery process, or the careless handling of a worker.

In general, the part having the quality problem may be generally filtered by a staff of the vehicle maker, and the filtering may be performed through the visual inspection of the staff.

Furthermore, when such a part problem is caused after the vehicle is completely assembled, since parts are disassembled and re-assembled, unnecessary man-hour (M/H) is required, and parts may be broken. If the quality problem of the part is not recognized before a vehicle is delivered to a customer, the field claim may be caused from the customer, and the safety of the customer may be threatened.

In addition to the quality problem of the part, vehicle quality may be caused in the assembling process of the production line. For example, when a wiring part is assembled with a twisted wiring in the assembling process of the wiring part in an engine compartment, the gap between the wiring part and a peripheral part may be narrowed and the interference between the wiring part and the peripheral part may be caused. Furthermore, when a vehicle is released with the above problem, the wiring may be burnt due to the interference between parts to cause a serious problem such as a fire.

In particular, since a part positioned in a deep portion, such as an engine compartment, inside a vehicle is not visually inspected when the vehicle is completed, it has to be consecutively monitored whether there is present a factor causing the degradation in quality of the vehicle, before the vehicle is completely assembled. However, all types of vehicles may not be actually monitored with the limited man-hour.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for verifying quality of a part using an arm robot may include an arm robot, which includes a camera to acquire image data of a part assembled in each manufacturing process of a vehicle, a carrier, which includes a sliding rail allowing the arm robot to be movable around the vehicle along the sliding rail to acquire the image data, and a server which receives the image data acquired by the camera, compares the image data with modeling data of the vehicle, which is stored in a database, and determines whether the assembled part satisfies a preset inspection item, to verify the quality of the assembled part, verifying the quality of the part in each process before the vehicle is completely manufactured, and a method for the same.

The technical problems to be solved by the present inventive concept are not limited to the aforementioned problems, and any other technical problems not mentioned herein will be clearly understood from the following description by those skilled in the art to which various exemplary embodiments of the present invention pertains.

Aspects of the present invention are directed to providing, a system for verifying quality of a part using an arm robot may include an arm robot, which includes a camera, which acquires image data of a part assembled in each manufacturing process of a vehicle, a carrier, which includes a sliding rail allowing the arm robot to be movable around the vehicle along the sliding rail to acquire the image data, and a server which receives the image data acquired by the camera, compares the image data with modeling data of the vehicle, which is stored in a database, and determines whether the assembled part satisfies a preset inspection item, to verify the quality of the assembled part.

Furthermore, the arm robot includes a multi-axis arm robot to control rotation of each joint thereof, and the camera is mounted on an end portion of the arm robot.

Furthermore, the carrier may include the sliding rail which provides a path for moving the arm robot around the vehicle, an arm robot controller which controls the driving of the arm robot moving on the sliding rail and the rotation of the joint of the arm robot, and a battery device which supplies power for driving the arm robot.

Furthermore, the carrier further includes a current position monitoring device which monitors a current position of the carrier in real time, based on data detected by at least one sliding rail sensor mounted on the sliding rail.

The carrier may further include a hidden area which is a storage space for a predetermined time period storing the arm robot and formed at a front lower portion and a rear lower portion of the carrier.

Furthermore, the carrier further includes an extending rail extending from the sliding rail surrounding the vehicle, to the hidden area.

Furthermore, the carrier further includes a hidden area controller to control an upper cover covering an upper portion of the hidden area to be open so that the arm robot is introduced into the hidden area, when the arm robot arrives at an end portion of the extending rail, and to control the upper cover to be closed when the arm robot is withdrawn out of the hidden area.

Furthermore, the carrier further includes a sliding rail sensor which detects whether the arm robot arrives at the end portion of the extending rail to be introduced into the hidden area, and a hidden area sensor which detects whether the arm robot is completely introduced into the hidden area or completely withdrawn out of the hidden area.

Furthermore, the server may include an image data comparator which compares the image data acquired from the camera with 3D modeling data of the vehicle, which is stored in the database, to specify a part to be verified in quality, and a quality verifying device which determines whether the image data of the specified part satisfies preset inspection items.

Furthermore, the server further includes an arm robot position determining device which determines the position of the arm robot moving around the carrier in each process, to acquire image data of a part additionally assembled in each process, and determines the position of the camera, which is adjusted as the joint of the arm robot is controlled at the determined position.

To the present end, when sensing that the carrier associated with the vehicle to be assembled passes a specific virtual point, the server is configured to determine a relevant process as being finished and performs a photographing operation by the camera.

Furthermore, the image data comparator is configured to receive the captured image data of the assembled part, the position coordinates of the camera at the moment that the image data is captured and information on a vector direction of a focus of the camera, when receiving the image data from the camera.

Furthermore, the quality verifying device is configured to set at least one inspection item in advance to verify the quality of each part, stores the at least one inspection item in an individual part inspection item DB of the DB provided in the server, compares image data showing a current assembling status of the vehicle with the 3D modeling data of the vehicle, and determines whether the relevant inspection item is satisfied.

Furthermore, according, various aspects according to various aspects of the present invention, a method for verifying the quality using the arm robot includes the step of photographing a part assembled in each process by use of a camera to acquire image data, after moving the arm robot coupled to the camera onto a sliding rail of a carrier, the step of comparing, by a server having the image data received through a communication network, the image data with 3D modeling data of a vehicle, which is stored in a DB, to specify a part to be verified in quality, and the step of verifying the quality of the assembled part by determining whether a preset inspection item is satisfied while comparing the image data of the specified part with the 3D modeling data of the vehicle.

Furthermore, in the step of acquiring the image data, a control operation of separating the arm robot from the sliding rail and for a predetermined time period storing the arm robot in a hidden area may be performed. When sensing that the arm robot is positioned at the end portion of the extending rail extending from the sliding rail to the hidden area, the hidden area controller is configured to control an upper cover, which covers an upper portion of the hidden area, to be open and introduces the arm robot into the hidden area.

Furthermore, the hidden area controller is configured to control the upper cover to be closed, when the arm robot is completely introduced into the hidden area or withdrawn out of the hidden area.

Furthermore, in the step of acquiring the image data, when sensing that a carrier associated with a vehicle to be assembled passes a preset virtual point, a relevant process is determined as being finished and the photographing by the camera is performed.

Furthermore, in the step of specifying the part, a part additionally assembled in an n-th(n is a natural number greater than or equal to 2) process, which is a current process, is detected, when compared to a (n−1)-th process, which is a previous process.

Furthermore, in the step of specifying the part, the position and the direction that the image data is acquired through photographing are detected by utilizing image data which is received over the communication network and stored in the image data and camera data DB of the DB provided in the server, information on the position coordinates of the camera, and information on the vector direction of the focus of the camera at the photographing time point for acquiring the image data.

Furthermore, in the step of verifying the quality of the assembled part, the image data is compared with the 3D modeling data of the vehicle to determine whether there is present an item which is not satisfied. When there is present an item which is not satisfied, that there is present the item which is not satisfied is notified to a worker around a field through a display device or an auditory device.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
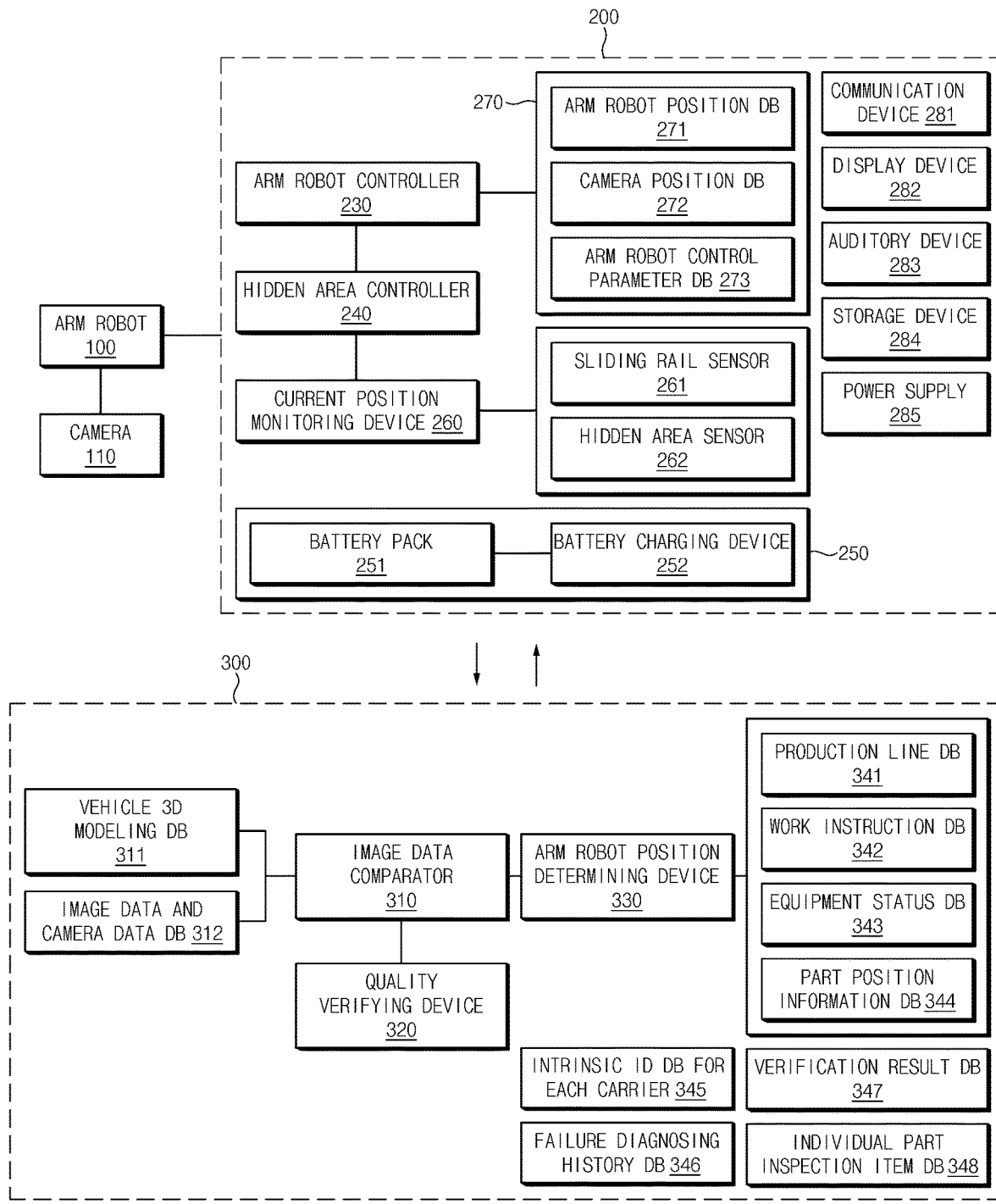
FIG. 1 is a block diagram illustrating a system for verifying quality of a part using an arm robot, according, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to accompanying drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application Hereinafter, embodiments of the present invention will be described in detail with reference to FIGS. 1 to 11.

Figure 2:
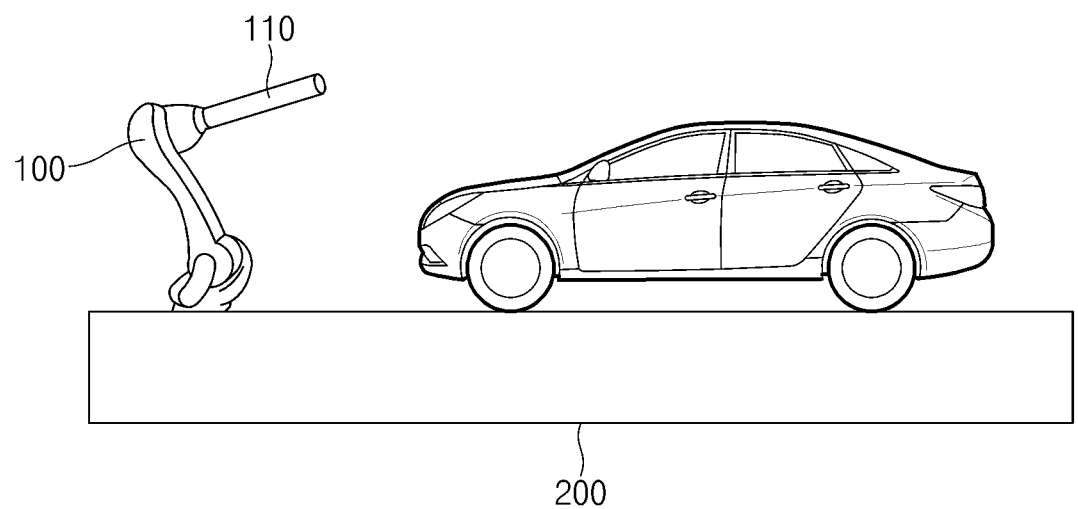
FIG. 2 is a view exemplarily illustrating an arm robot, which acquires image data of assembled parts of a vehicle, and a carrier, according, according to various exemplary embodiments of the present invention.

FIG. 1 is a block diagram illustrating a system for verifying quality of a part using an arm robot, according, according to various exemplary embodiments of the present invention, and FIG. 2 is a view exemplarily illustrating an arm robot, which acquires image data of assembled parts of a vehicle, and a carrier, according to various exemplary embodiments of the present invention.

Referring to FIG. 1 and FIG. 2, according to various exemplary embodiments of the present invention, a system for verifying quality of a part using an arm robot may include an arm robot 100, which includes a camera to acquire image data of a part assembled in each manufacturing process of a vehicle, a carrier 200, which includes a sliding rail allowing the arm robot 100 to be movable around the vehicle to acquire the image data, and a server 300 which receives the image data acquired by the camera, compares the image data with modeling data of the vehicle, which is stored in a database, and determines whether the assembled part satisfies a preset inspection item, to verify the quality of the assembled part.

In the instant case, the arm robot 100 may move on a sliding rail 210 to move the camera to various positions at which the part is assembled, acquiring image data for determining an assembling status of a part additionally assembled in each process.

The arm robot 100 may include a multi-axis arm robot to increase the degree of freedom of the camera changed in position to acquire the image data.

Furthermore, the camera 110 is assembled on an end portion of the arm robot 100. Accordingly, as illustrated in FIG. 2, when the multi-axis arm robot forms a joint structure of the shoulder, the elbow, and the wrist of a human being, the camera assembled on the end portion corresponds to a finger such that image data of a deep portion inside the vehicle is acquired.

The camera 110, which is movable to the deep portion inside the vehicle, may acquire not only image data of an assembled part around an external portion of the vehicle, but also image data of an assembled part at the deep portion, such as an engine compartment, inside the vehicle. Furthermore, the camera 110 may include a lighting device used when photographing an assembled part in a dark area.

Furthermore, to adjust each joint of the arm robot 100, which has a multi-axis structure, at various angles, an arm robot controller 230 provided on a carrier may control the movement on the sliding rail of the arm robot and the rotating operating of the multi-axis structure through an arm robot control parameter database (DB) 273, which is previously stored in a DB 270.

As described above, the arm robot controller 230 may control the position of the arm robot and the position of the camera such that the camera 110 is moved to a position for photographing the assembled part, and then may transmit image data captured by the camera to the server 300 through a communication network such that the image data is used to verify the quality of the assembled part.

Furthermore, the carrier 200 may include the sliding rail 210, which provides a path for moving the arm robot around the vehicle, the arm robot controller 230, which controls the driving of the arm robot moving on the sliding rail and the rotation of the joint of the arm robot, and a battery device 250 which supplies power for driving the arm robot 100.

Figure 3:
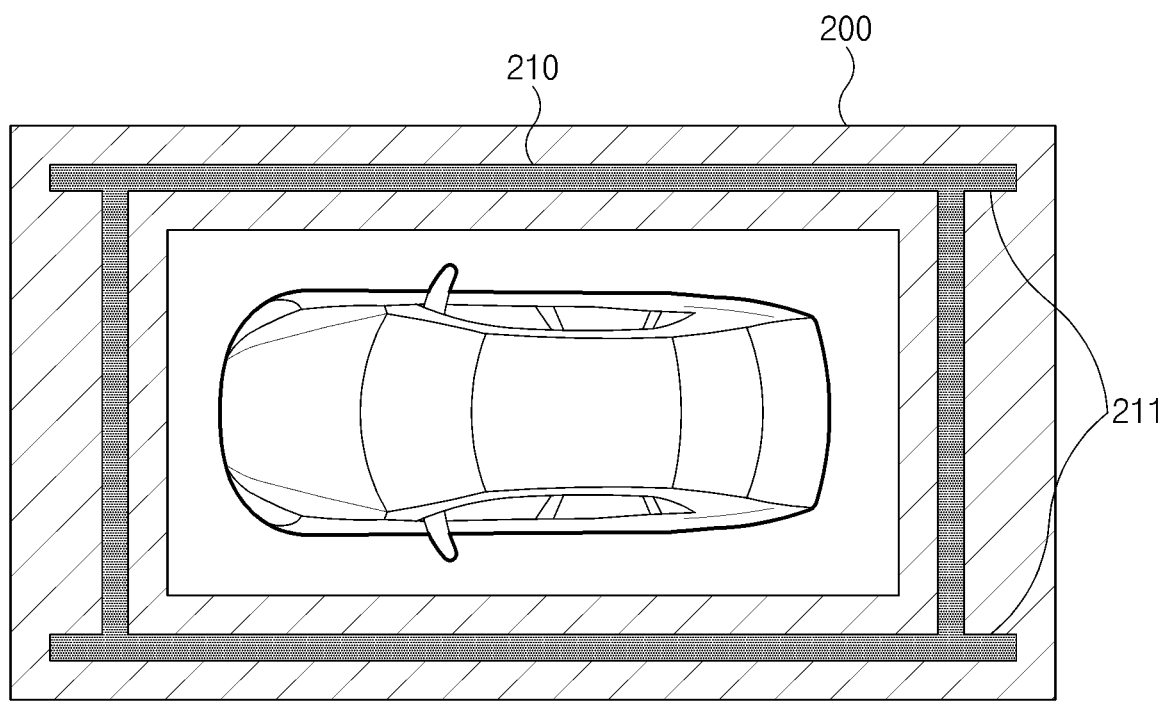
FIG. 3 is a view exemplarily illustrating a sliding rail indicating an area in which an arm robot is movable, according, according to various exemplary embodiments of the present invention.

The sliding rail 210 may include a rail which is spaced from the vehicle by a specific distance and configured to surround a space in which the vehicle is positioned. Accordingly, the sliding rail 210 may be formed in a substantially rectangular structure surrounding the vehicle, as illustrated in FIG. 3.

As described above, as the sliding rail 210 is formed around the vehicle, even if the position of a part assembled in each process is varied, the arm robot may move around the vehicle on the sliding rail and may move a position at which the image data is easily acquired. In FIG. 3, an area, in which the arm robot moves to operate to acquire the image data, is indicated as a hatched area around the vehicle.

Figure 4:
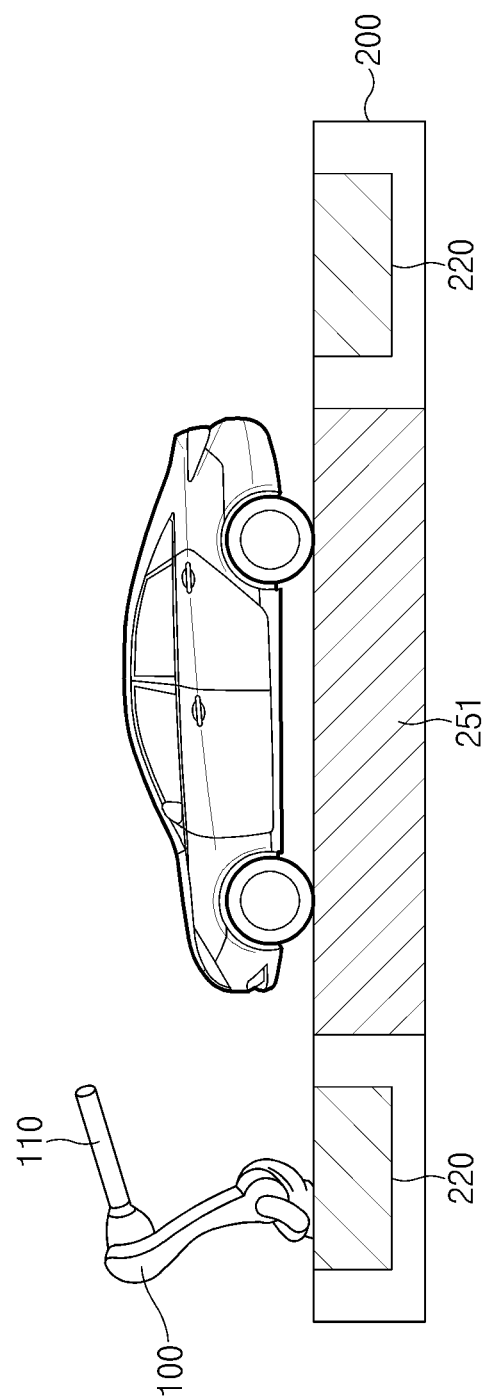
FIG. 4 is a view exemplarily illustrating the layout of a hidden area, in which an arm robot is movable, and a battery pack, according, according to various exemplary embodiments of the present invention.
Figure 5:
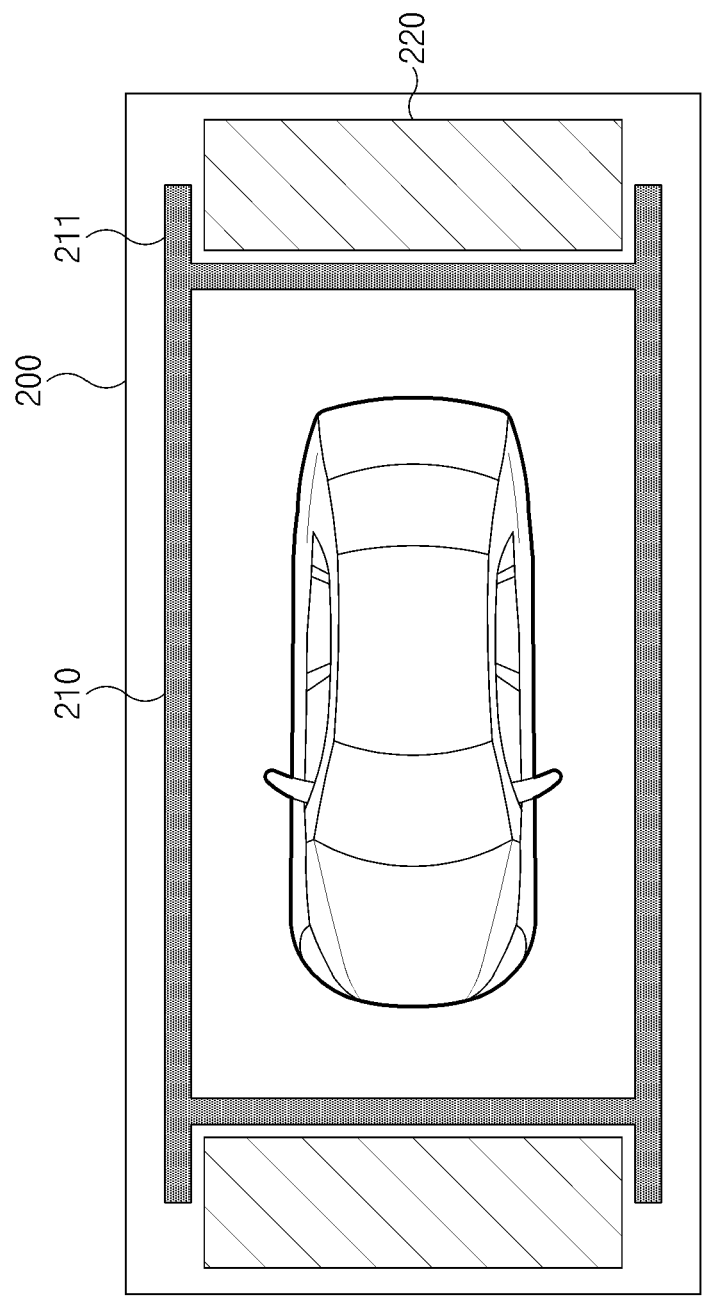
FIG. 5 is a plan view exemplarily illustrating a hidden area in which an arm robot is movable, according, according to various exemplary embodiments of the present invention.

Meanwhile, the carrier 200 may further include a hidden area 220, which is a storage space for temporarily storing the arm robot and formed at a front lower portion and a rear lower portion of the carrier, as illustrated in FIG. 4 and FIG. 5. In the instant case, the hidden area 220 is not limited to the front portion and the rear portion of the carrier, but formed in another position.

When the arm robot is not available to acquire image data due to the interference with another equipment performing a process, or the operation of the arm robot is unstable as the carrier vertically moves to an overhead, the arm robot needs to separate from the sliding rail and to temporarily be stored.

As described above, the situations in which the arm robot is not normally used or not normally operated, are varied depending on production lines for performing processes. Accordingly, the carrier makes coordinates for placing the arm robot in each process on the production line and stores the coordinates in an arm robot position DB 271 of the database 270, properly controlling the position of the arm robot to acquire image data during the process.

In the instant case, the carrier 200 may further include an extending rail 211 extending from the sliding rail 210, which surrounds the vehicle, to the hidden area. Accordingly, the arm robot 100 may move to the hidden area along the sliding rail 210 or may move out of the hidden area, under the control of the arm robot controller 230.

FIG. 5 illustrates that the hidden area is formed at the front lower portion and the rear lower portion of the carrier, in which the extending rail is formed to additionally move toward a front portion or a rear portion of the carrier in a 1 o'clock direction, a 5 o'clock direction, a 7 o'clock direction, and an 11 o'clock direction of the sliding rail formed in a rectangular structure around the vehicle. In the instant case, the extending direction of the extending rail 211 from the sliding rail 210 may be varied depending on the position of the hidden area 220.

Furthermore, to acquire image data for verifying the quality of the assembled part during each process, the arm robot controller 230 may generate a control command for controlling the arm robot 100 to move to a position for photographing the assembled part and for controlling the rotation of the joint of the arm robot such that the camera photographs the assembled part at the relevant position.

To the present end, the arm robot controller 230 may retrieve information on a proper position of the arm robot 100 in each process, from the arm robot position DB 271 stored in the database 270 of the carrier 200, and may control the arm robot 100 to move on the sliding rail 210. In the instant case, the process at the current position of the carrier 200 may be identified by a current position monitoring device 260 to be described below.

Furthermore, the arm robot controller 230 may acquire information on a proper position of the camera 110 for acquiring the image data of the assembled part in each process, from a camera position DB 272 stored in the database 270 provided in the carrier 200, and may control the rotation of the joint of the arm robot 100 having the multi-axis structure.

In the instant case, a control value of a parameter necessary to control the rotation of the joint of the arm robot having the multi-axis structure for adjusting the position of the camera may be retrieved from an arm robot control parameter DB 273 stored in the database 270 provided in the carrier 200.

Furthermore, the carrier 200 may further include a hidden area controller 240 to control an upper cover covering an upper portion of the hidden area 220, to be open such that the arm robot 100 is introduced into the hidden area 220, when the arm robot 100 arrives at the end portion of the extending rail 211, and to control the upper cover to be closed when the arm robot 100 is withdrawn out of the hidden area 220.

The hidden area 220, which is a space for temporarily store the arm robot 100, is normally maintained to be covered with the upper cover. However, when sensing that the arm robot 100 is positioned at the end portion of the extending rail 211, the hidden area controller 240 may recognize that the arm robot 100 moves to the extending rail 211 to be introduced into the hidden area 220, and may control the upper cover to be open. Thereafter, when determining that the arm robot 100 is completely introduced into the hidden area 220, the hidden area controller 240 may close the upper cover to store the arm robot 100.

Furthermore, when the arm robot 100 is withdrawn out of the hidden area 220 to acquire the image data, the hidden area controller 240 opens the upper cover, and the arm robot controller 230 may control the arm robot 100 to be withdrawn out of the hidden area 220 and to move on the sliding rail 210.

To the present end, the carrier 200 may further include a sliding rail sensor 261, which detects whether the arm robot 100 arrives at the end portion of the extending rail 211 to be introduced into the hidden area 220, and a hidden area sensor 262 which detects whether the arm robot 100 is completely introduced into the hidden area 220 or completely withdrawn out of the hidden area 220. The sliding rail sensor 261 and the hidden area sensor 262 may include ultrasonic sensors to detect the arm robot 100 at a sensing position.

Accordingly, the hidden area controller 240 may control the upper cover to be open, as the sliding rail sensor 261 detects whether the arm robot 100 is present at the end portion of the extending rail 211.

Furthermore, the hidden area controller 240 may control the upper cover to be closed, as the hidden area sensor 262 detects whether the arm robot 100 is normally introduced into the hidden area 220 or completely withdrawn out of the hidden area 220, after the upper cover opens the hidden area 220.

As described above, the arm robot 100 may be introduced into the hidden area 220 after moving to the extending rail 211 under the control of the hidden area controller 240 and the control of the arm robot controller 230, when the carrier 200 is not only stopped, but moving.

Furthermore, the battery device 250 may include a battery pack 251, which supplies power necessary for the carrier 200 when driving the arm robot 100, acquiring the image data from the camera sensor, and opening/closing the upper cover, and a battery charging device 252 which charges the battery pack 251 with power.

In general, power needs to be stably supplied from a time point of assembling a vehicle to a Line-out time point such that the assembling process of the vehicle is stably performed. To the present end, power may be variously supplied depending on manners of producing the vehicle.

Accordingly, in some factories employing a manner of assembling all parts at one spot, instead of a smart factory or a factory employing a conveyor manner that a vehicle subject to assembling physically flows, power may be supplied by connecting a wired power supply line through the lower portion of a carrier having an arm robot assembled thereon.

Furthermore, in a factory employing a typical conveyor manner, power may be supplied through a battery pack embedded in a carrier, as illustrated in FIG. 4. In the instant case, the battery pack needs to periodically be charged with power.

To the present end, a carrier, which returns to a first process after the vehicle is completely assembled, may charge the battery pack with power through a wires power supply line or through a wireless power supplying manner, while staying in a specific space after Line out.

Furthermore, when the power is wirelessly charged, the carrier may be charged with power through the wireless power supplying manner while staying in the specific space after Line out, or may be wireless supplied with power in real time while moving, as an infrastructure to wirelessly supply power in all sections is constructed. Alternatively, infrastructures to wirelessly supply power are constructed under all conveyors or under conveyors in some section such that power is wirelessly supplied.

Furthermore, the carrier 200 may further include the current position monitoring device 26 which monitors a current position of the carrier 200 in real time, based on data detected by at least one sliding rail sensor 261 mounted on the sliding rail 210.

In other words, the current position monitoring device 260, which detects a process in which the carrier 200 is positioned, may be used to determine a time point to acquire image data by the carrier 200.

Furthermore, the carrier 200 may further include the database 270 which stores information on position coordinates and information on a control parameter necessary when controlling the arm robot 100 to acquire image data of an assembled part in each process.

The database may include an arm robot position DB 271, which stores information on position coordinates indicating a proper position of the arm robot 100 on the carrier 200 in each process, the camera position DB 272, which stores information on position coordinates indicating a proper position of the carrier 200 in each process, and the arm robot control parameter DB 273 which stores a control value of a control parameter for controlling the joint of the arm robot 100 to move the camera to a desired position.

Furthermore, the carrier 200 may include a communication device 281, which receives the information on the position coordinates of the arm robot 100 and the information on the position coordinates of the camera 110, and transmits the image data captured by the camera 110 while making communication with the server 300, a display device 282, such as a display, or a three-color lamp, which visually expresses a quality verification result determined by the server 300, and information to be recognized by a worker at the field of the process, an auditory device 283, such as a speaker, which audibly provides the information to be recognized by the field worker, a storage device 284, such as a memory, which stores data of the DB, and a power supply 285 which controls supplying of power to components of the arm robot 100 and the carrier 200.

Furthermore, the server 300 may include an image data comparator 310, which compares the image data acquired from the camera 110 with 3D modeling data of the vehicle, which is stored in the database, to specify a part to be verified in quality, and a quality verifying device 320 which determines whether the image data of the specified part satisfies preset inspection items.

In the instant case, the server 300 may determine, in advance, whether an intrinsic ID of the arm robot 100, which is transmitted from the carrier 200, is matched with an intrinsic ID of the arm robot 100, which is stored in the database of the server 300, when making wireless communication to receive the image data from the carrier 200.

To the present end, the unit ID is assigned to the arm robot 100 positioned in the each carrier 200 through a hot encoding manner, and the assigned intrinsic ID may be stored in the storage device of the carrier 200 having the arm robot 100 and the DB of the server 300.

Furthermore, the server 300 and the carrier 200 may make wireless communication in a preset period from a time point at which the carrier 200 is introduced into a first process. The server 300 may compare the intrinsic ID of the arm robot 100, which is received from the carrier 200 through the first communication, with an intrinsic ID stored in the DB to determine whether the intrinsic ID of the arm robot 100, which is received from the carrier 200 through the first communication, is matched with the unique ID of the arm robot 100, which is to transmit image data in a current process.

To the present end, the server 300 may further include a failure status determining device which determines the failure status of the arm robot 100 and determines whether the arm robot 100, which is to transmit the image data in each process, is correct, by use of the intrinsic ID stored in the database.

In the instant case, the failure status determining device may perform a process and acquire image data, when the intrinsic ID received from the arm robot 100 is matched with the intrinsic ID of the arm robot 100, which is stored in an intrinsic ID DB 345 for each carrier in the DB, and may provide the feedback of the comparison result to a surrounding worker by use of the display device or the auditory device provided in the arm robot 100, when the intrinsic ID received from the arm robot 100 is not matched with the intrinsic ID of the arm robot 100, which is stored in the intrinsic ID DB 345 for each carrier in the DB. Furthermore, the determination result made by the failure status determining device may be stored in a failure diagnosing history DB 346 provided in the server 300.

As described above, the intrinsic ID is assigned to the arm robot 100 and the server 300 determines the ID matching status by use of the intrinsic ID transmitted from each arm robot 100, because the assembling process for various vehicles having different specifications is performed, even if the same type of vehicles is produced on the same production line. Furthermore, this is because it is necessary to detect the specification of a vehicle for image data acquired by a specific arm robot 100, because vehicles having different specifications in engines, regions, or functions may employ different parts, and there may be a part, which is not available, or a part which is additionally applied.

Furthermore, the server 300 may further include an arm robot position determining device 330 which determines the position of the arm robot 100 moving around the carrier 200 in each process, to acquire image data of a part additionally assembled in each process, and determines the position of the camera 110, which is adjusted as the joint of the arm robot 100 is controlled at the determined position.

The carrier 200 undergoes mutually different several processes while moving along a conveyor. In the instant case, various parts are mounted in each process, and the posture and the position of the carrier 200 to perform a work may be changed depending on parts to be mounted. Furthermore, the position for loading a part to be mounted on the vehicle may be different, depending on the operating situation of the factory. Some parts may be introduced by automation machine, and some parts may be assembled by use of labour saving equipment. Furthermore, the position of a tool box used when assembling parts may be different in each process, and the position for assembling a part for image data to be intensively acquired by the arm robot 100 in each process may also be different.

Figure 6:
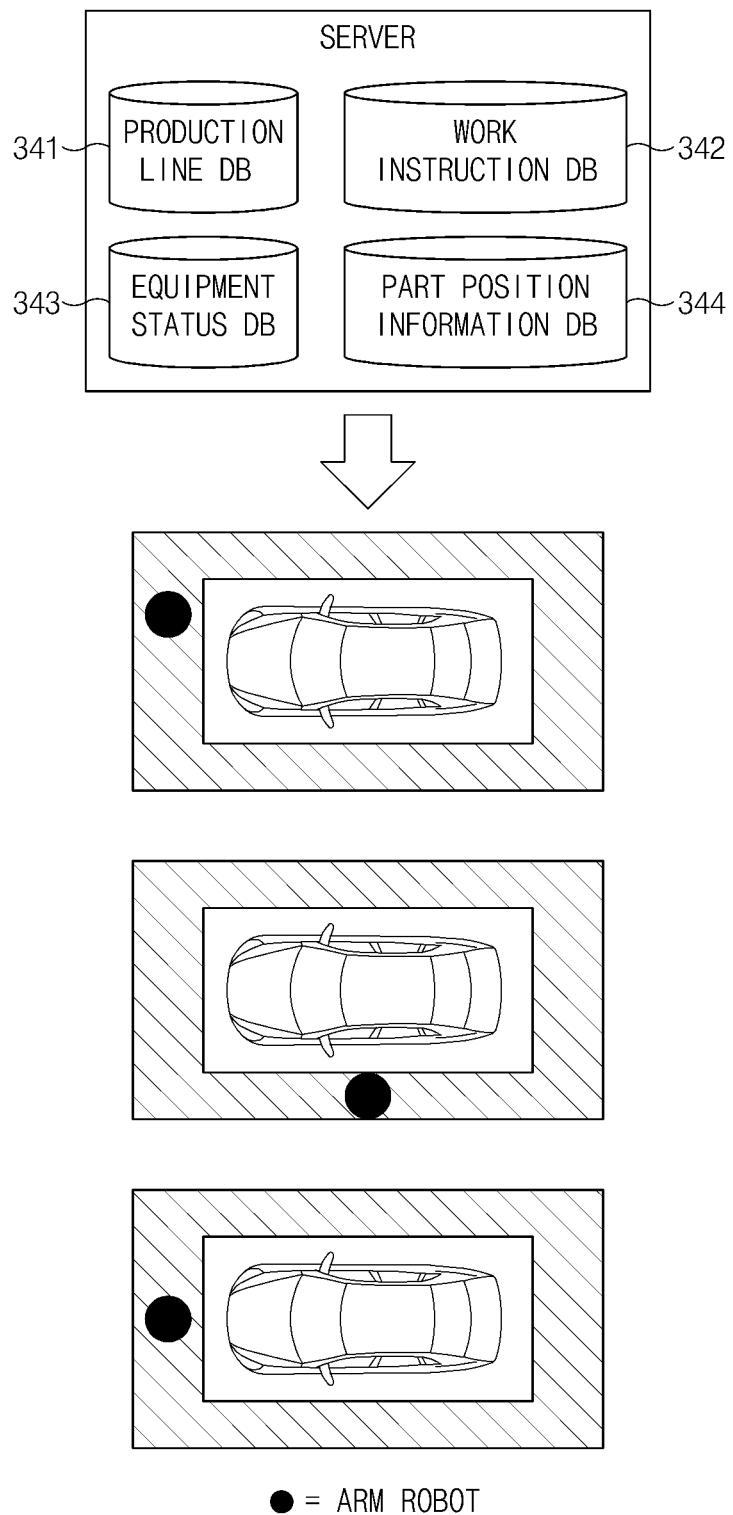
FIG. 6 is a view exemplarily illustrating the position of an arm robot varied depending on an assembling process, according, according to various exemplary embodiments of the present invention.

Accordingly, after a production line DB 341, a work instruction DB 342, an equipment status DB 343, and a part position information DB 344 are constructed in the DB 270 in advance, depending on the conditions of each factory, and the type and the specification of a produced vehicle, as illustrated in FIG. 6, the arm robot position determining device 330 may determine position coordinates of the arm robot 100 around the carrier 200, which is to be positioned to acquire image data in each process, and position coordinates of the camera 110 at a position at which the arm robot 100 is temporarily fixed to acquire the image data of the assembled part, based on information from the DB.

As described above, the position coordinates of the arm robot 100 around the carrier 200 in each process may be determined as being at a front portion of the right side of the carrier 200 or at the center portion of a left side of the carrier 200, as illustrated in FIG. 6. Furthermore, in a specific situation that the arm robot 100 is not used, the coordinates of the hidden area positioned at the front portion or the rear portion of the carrier 200 may be determined the position coordinates of the arm robot 100.

Furthermore, the arm robot position determining device 330 may adjust the position of the camera 110 by controlling the joint of the arm robot 100 having the multi-axis structure such that at least two parts at mutually different positions in each process may be photographed if necessary.

The determined position coordinates of the arm robot 100 and the determined position coordinates of the camera 110 may be stored in the arm robot position DB 271 and the camera position DB 272 provided in the carrier 200 through the communication network, and may be used as data for controlling the position of the arm robot 100 and the position of the camera 110 by the arm robot controller 230.

In the instant case, the production line DB 341 may store all information associated with the production of the vehicle in the relevant factory. Accordingly, for example, the production line DB 341 may store information on unit per hour (UPH) of the relevant factory. Furthermore, the work instruction DB 342 may store information, such as a work manner, a work posture, and a required work time, which are instructions required for performing work for each process. Furthermore, the equipment status DB 343 may store information on a process in which the automation equipment or labor saving equipment is positioned. The part position information DB 344 may store information on the position of an individual part attached to the vehicle having a specific specification.

Furthermore, the server 300 may control the arm robot 100 to set a time point, at which image data is started to be captured, as a time point at which the assembling is completed by a worker. To the present end, the server 300 may set a virtual capturing time point by use of information stored in the production line DB 341 having information on the UPH of the work performed on the conveyor and the work instruction DB 342 having information on time periods required to assemble parts by works.

The virtual time point of the photographing may be set by use of information on the UPH and the information the timer periods required to assemble parts in a sanctuary process. In a process performed by automated machine, the time point of the photographing may be set such that the photographing starts when the operation of the automated machine is finished.

Figure 7:
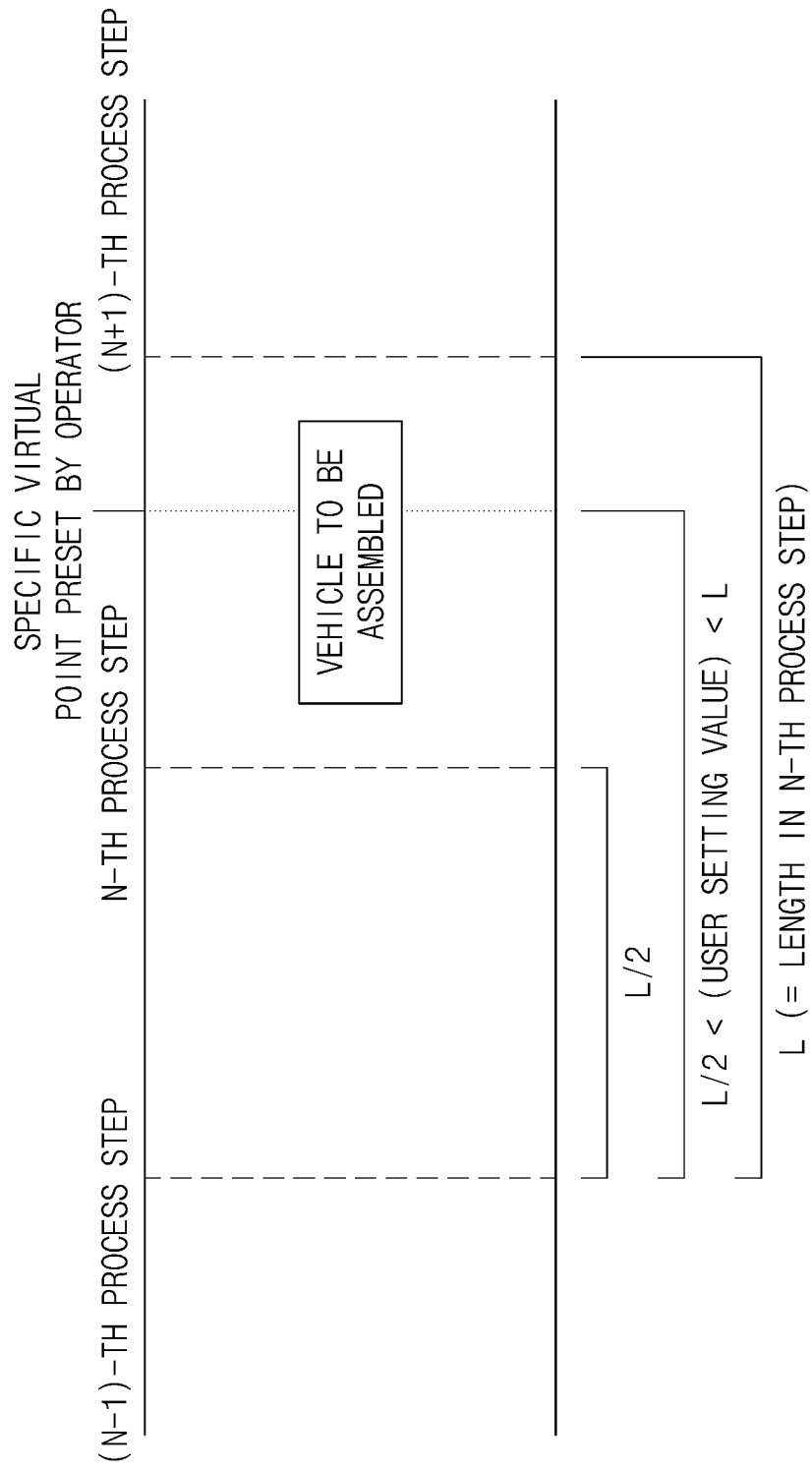
FIG. 7 is a view exemplarily illustrating a time point at which image data of an arm robot is started to be acquired, according, according to various exemplary embodiments of the present invention.

Furthermore, the server 300 may be configured to determine the assembling work of the worker or the process performed by the automated machine as being finished, and may allow the camera 110 to perform a capturing operation, when a carrier 200 associated with a vehicle to be assembled passes a specific virtual point, which is preset by an operator as illustrated in FIG. 7.

The time point of the photographing by the camera 110 is set based on the change in a movement point of the carrier 200 as described above, preventing the arm robot 100 from moving to capture the image data to interrupt the process or to threaten the safety of the worker, before the work is finished. Even if the time point of the photographing by the camera 110 is set based on the change in a movement point of the carrier 200, when the arm robot 100 is started to move, the movement of the arm robot 100 may be notified to the outside through the display device or the auditory device to ensure the safety of the workers.

Furthermore, the image data comparator 310 may receive the position coordinates of the camera 110 at the moment that the image data is captured and information on a vector direction of a focus of the camera, as well as the captured image data of the assembled part, when receiving the image data from the camera 110, specifying a part corresponding to the currently captured image data.

As described above, the image data transmitted through the communication device by the carrier 200 after captured by the camera 110, the position coordinates of the camera at the capturing time point for acquiring the image data, and the information on the vector direction of the focus of the camera may be stored in an image data and camera data DB 312 of the DB provided in the carrier 200.

In the instant case, the position coordinates of the camera 110 and the information on the vector direction of the focus of the camera may be determined based on reference coordinates defined in advance by the operator. Furthermore, the accuracy in specifying the part to verify the quality may be improved by detecting the capturing position and the capturing direction of the image data among a front portion, a rear portion, a right portion or a left portion of an external portion of the vehicle, based on the position coordinates of the camera 110 and the information on the vector direction of the focus of the camera.

Furthermore, the image data comparator 310 may perform a pre-process which is preset by the operator. For example, the image data comparator 310 may derive a region on interest (ROI) from the image data acquired from the camera and may filter out remaining regions other than the ROI.

Furthermore, the image data comparator 310 may compare the image data with the 3D modeling data of the vehicle, which is obtained by modeling the information on the form and the position of each part of the vehicle, specifying the part to be verified in quality.

To the present end, the server 300 may store, in a vehicle 3D modeling DB 311 of the DB provided in the carrier 200, the 3D modeling data of the vehicle, which is obtained by 3D-modeling the information on the form and the position of each part of the vehicle based on specific fixed absolute coordinates. In the instant case, the information on the position of each part, which is stored in the part position information DB 344, may be used together.

Furthermore, the quality verifying device 320 may determine whether the problem in quality of the part specified by the image data comparator 310 is present, by comparing the image data showing the current assembling status of the vehicle with the 3D modeling data of the vehicle.

To the present end, the quality verifying device 320 may set at least one inspection item in advance to verify the quality of each part, may store the at least one inspection item in an individual part inspection item DB 348 of the DB provided in the server, and may determine whether the relevant item is satisfied, determining whether there is present a problem in the part and the assembling process of the part.

For example, the quality verifying device 320 may determine whether a twist occurs in a wiring part in an engine compartment during the assembling process, and whether a gap (GAP) from a surrounding part is sufficiently secured (whether the SPEC of the vehicle maker is satisfied, ex; Lack of gap), whether interference with a surrounding part occurs, or whether an extra wiring length is appropriate as compared to that in the specification.

Furthermore, the quality verifying device 320 may determine whether the gap between parts is sufficiently secured, whether a step specification is satisfied, whether surface treatment is defective, or whether painting is defective, when the photographed part is associated with a vehicle body or is an external part.

The quality verifying device 320 may determine whether the inspection items are satisfied, based on the comparison result between the image data and the 3D modeling data. In other words, since the 3D modeling data of the vehicle shows ideal forms of parts, the 3D modeling data is compared with the image data of a real assembled part such that whether the inspection item is satisfied is rapidly and exactly detected.

As described above, the determination result ("OK" when the inspection item is satisfied; "NG" when the inspection item is not satisfied) for each inspection item, which is made by the quality verifying device 320, may be stored in a verification result DB 347 of the DB provided in the server.

In the instant case, the verification results stored in the verification result DB 347 are categorized, classified, and stored depending on the setting by the operator with respect to parts (electronic parts, internal parts, a vehicle body, external parts, moving parts, or chassis parts) and production line process (Trim, Faital, OK, or Inspection).

Furthermore, when "OK" or "NG" occurs as the verification result of the qualify verifying device 320, the verification result is transmitted in real time to a worker on the production line and to an assembly/quality managers such that a follow-up action for quality improvement may be rapidly made.

Furthermore, the server 300 may include a communication device allowing transmission or reception of various data including image data through the communication with the carrier 200, a storage device which stores the various data, and a power supply which supplies power to operate the server 300.

Hereinafter, a method for verifying quality of a part using an arm robot, according, according to various exemplary embodiments of the present invention will be described with reference to FIG. 8.

Figure 8:
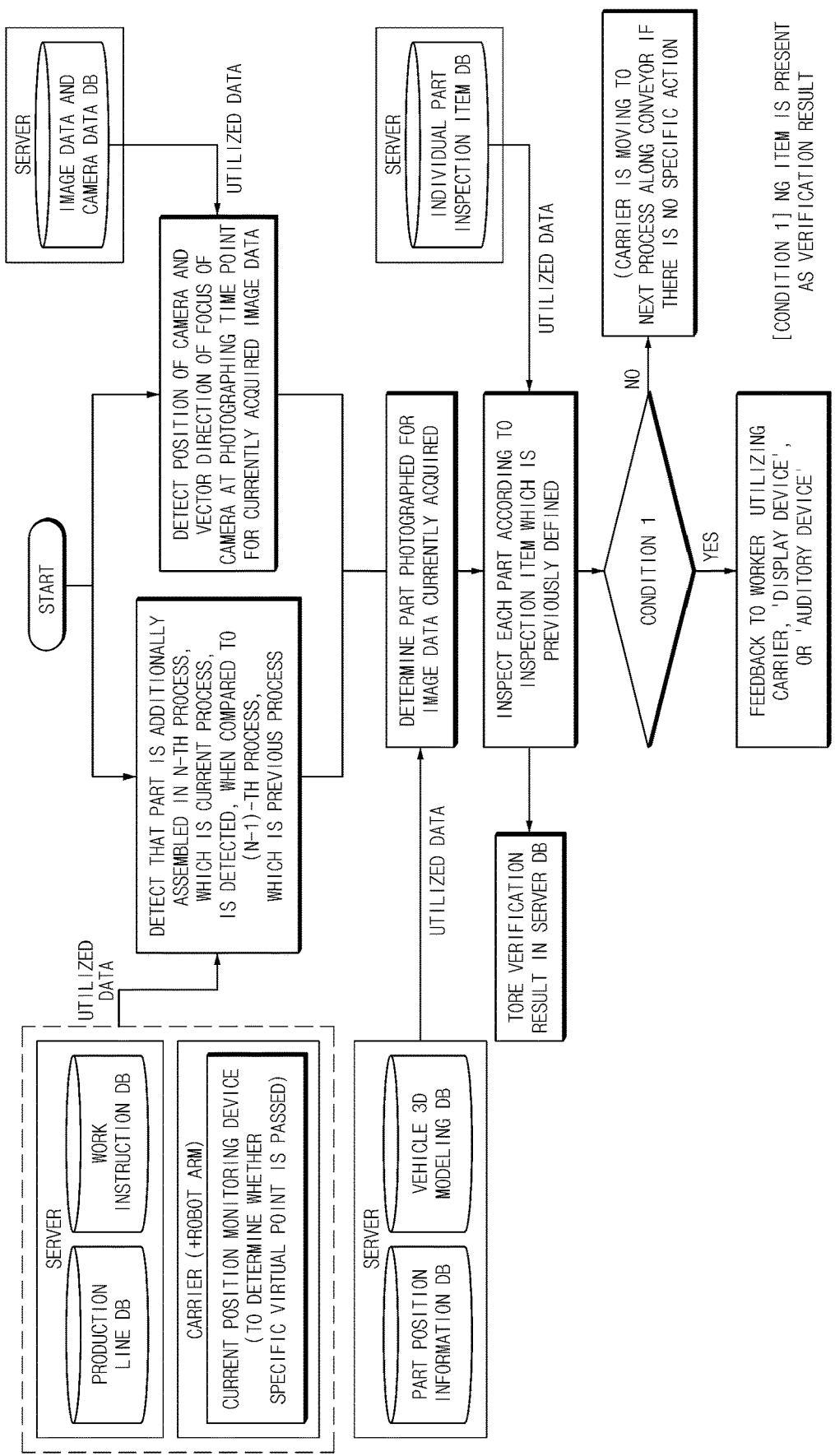
FIG. 8 is a flowchart illustrating a method for verifying quality of a part using an arm robot, according, according to various exemplary embodiments of the present invention.

Referring to FIG. 8, according, according to various exemplary embodiments of the present invention, the method for verifying the quality using the arm robot may include the step of moving an arm robot coupled to a camera onto a sliding rail of a carrier, photographing a part assembled in each process by use of the camera, and acquiring image data, the step of comparing the image data with 3D modeling data of a vehicle, which is stored in a DB, by a server having the image data received therein through a communication network, and specifying a part to be verified in quality, and the step of verifying the quality of the assembled part by determining whether a preset inspection item is satisfied while comparing the image data of the specified part with the 3D modeling data of the vehicle.

In the instant case, in the step of acquiring image data, the arm robot is moved onto the sliding rail and the rotation of each joint forming the arm robot is controlled under the control of an arm robot controller such that the arm robot and the camera coupled to the arm robot are moved to a position for easily acquiring image data of a part additionally assembled in each process.

To control the position of the arm robot as described above, position coordinates indicating a proper position of the arm robot in each process on a production line are stored in the arm robot position DB for each process, which is included in the DB provided in the carrier, and the arm robot moves on the sliding rail by use of the position coordinates of the arm robot in each process.

In the instant case, when controlling the position of the arm robot, a control operation of separating the arm robot from the sliding rail and temporarily storing the arm robot in a hidden area may be performed. To the present end, a hidden area, which is a storage space for temporarily storing the arm robot, may be provided at a front lower portion and a rear lower portion of the carrier.

Figure 11:
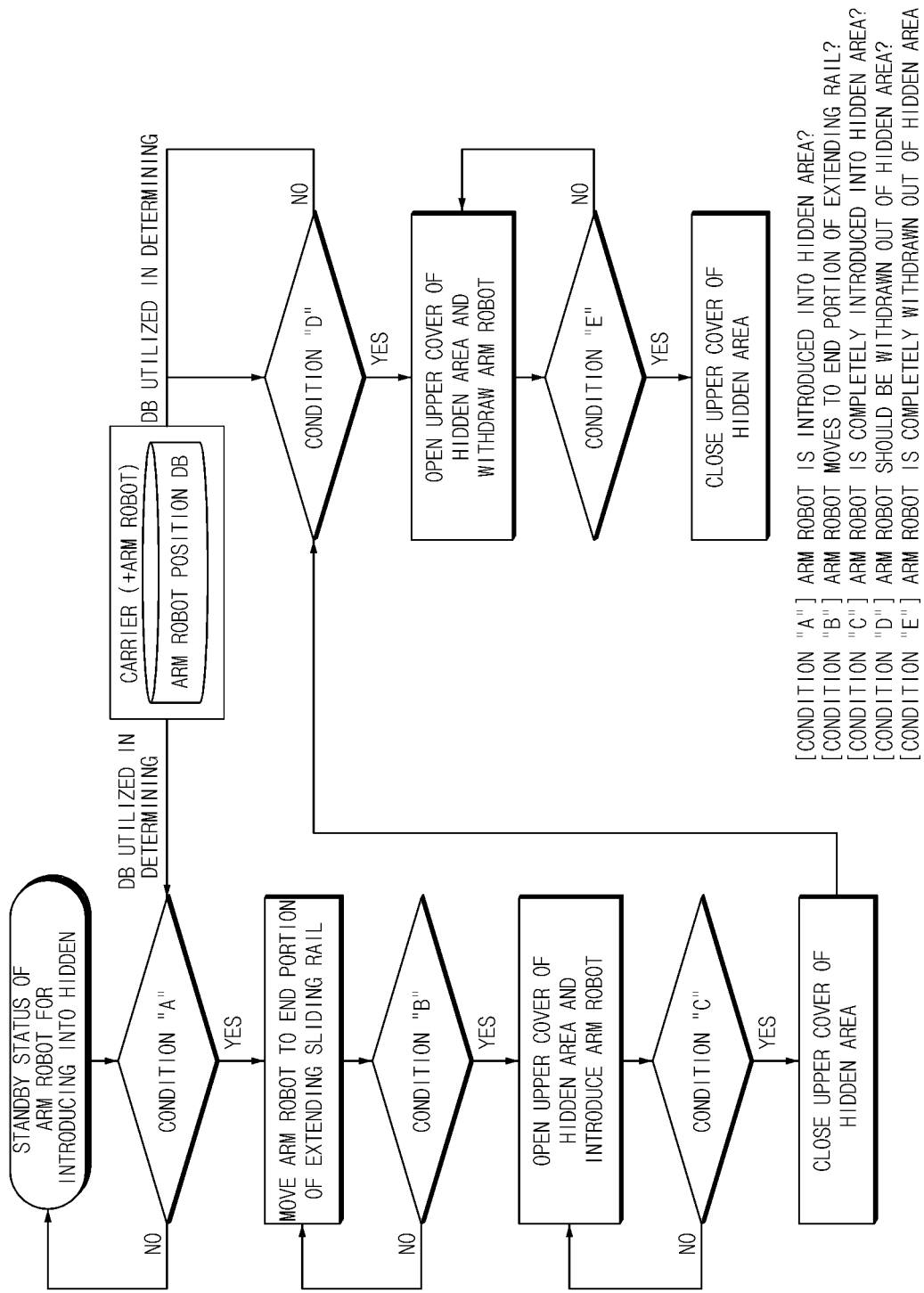
FIG. 11 is a flowchart illustrating a procedure in which an arm robot is withdrawn out of a hidden area after introduced into the hidden area, according, according to various exemplary embodiments of the present invention.

To store the carrier in the hidden area, as shown in condition "A" of FIG. 11, a hidden area controller provided in the carrier may determine whether the arm robot needs to be introduced into the hidden area during a current process, by utilizing data in an arm robot DB provided in the DB. When the arm robot does not need to be introduced into the hidden area ("No") as the determination result, a standby status for introducing into the hidden area is continuously maintained. When the arm robot needs to be introduced into the hidden area ("YES"), the arm robot controller may move the arm robot to an extending rail extending from the sliding rail to the hidden area.

Furthermore, when the arm robot is detected to be at the end portion of the extending rail, as the sensing result of a sliding rail sensor, after the hidden area controller determines whether the arm robot moves to the end portion of the extending rail (condition "B"), the hidden area controller may control an upper cover, which covers an upper portion of the hidden area, to be open and may introduce the arm robot into the hidden area.

Thereafter, when the arm robot is detected as being normally introduced into the hidden area, as the sensing result of the sliding rail sensor, after the hidden area controller determines whether the arm robot is completely introduced into the hidden area (condition "C"), the hidden area controller may control the upper cover to be closed.

Furthermore, after the hidden area controller determines whether to withdraw the arm robot out of the hidden area, as the verification of the quality using the arm robot is required in the next process (condition "D"), the hidden area controller may control the upper cover to be open and separate the arm robot from the hidden area.

In the instant case, after the hidden area controller determines whether the arm robot is normally withdrawn out of the hidden area (condition "E"), the arm robot is detected as being normally withdrawn out of the hidden area as the sensing result of the hidden area sensor, the hidden area controller may control the upper cover to be closed.

Furthermore, in the step of acquiring the image data, after the part is completely assembled in each process, the arm robot may move to a position for acquiring image data, and the position of the camera may be controlled To the present end, the step of acquiring the image data may be configured such that, when a carrier associated with a vehicle to be assembled passes a specific virtual point, which is preset by an operator, the relevant process is determined as being finished and the photographing by the camera is performed.

Figure 9:
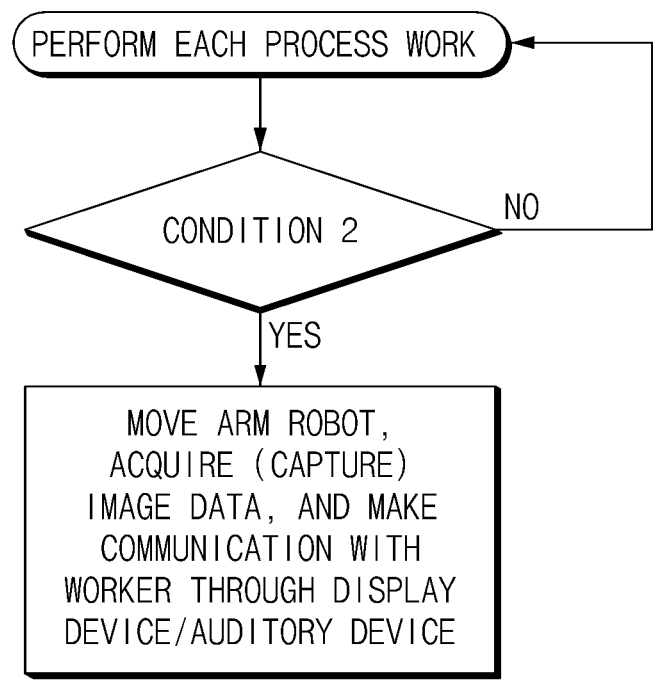
FIG. 9 is a flowchart illustrating determination of whether a time point for acquiring image data comes, according, according to various exemplary embodiments of the present invention.

Accordingly, as illustrated in FIG. 9, during a work for each process which is sequentially performed to produce a vehicle by assembling various parts, the server may determine a situation corresponding to condition 2, that is, may determine whether the carrier passes the specific virtual point preset by a user, while monitoring the position of the carrier.

Furthermore, when the carrier does not pass the specific virtual point ("NO"), the work for the relevant process is continuously performed. When the carrier passes the specific virtual point ("YES"), the arm robot controller may move the arm robot onto the sliding rail, adjusts the position and the direction of the camera, and acquires image data. In the instant case, information is provided to the outside by use of a display device, such as a display or a three-color lamp, and an auditory device, such as a speaker such that workers in a real filed communicates with each other, preventing a worker positioned around the arm robot from being damaged during the movement of the arm robot.

A time point of the photographing by the camera is set based on the change in a movement point of the carrier as described above, preventing the arm robot from moving to capture the image data, to interrupt the process or to threaten the safety of the worker, before the work is finished.

Furthermore, in the step of acquiring the image data, during preparing for involving the carrier into a process, whether the carrier is involved into the process may be determined by first determining whether an intrinsic ID assigned to the arm robot is matched with an intrinsic ID stored in the server, through the data communication between the arm robot and the server.

Figure 10:
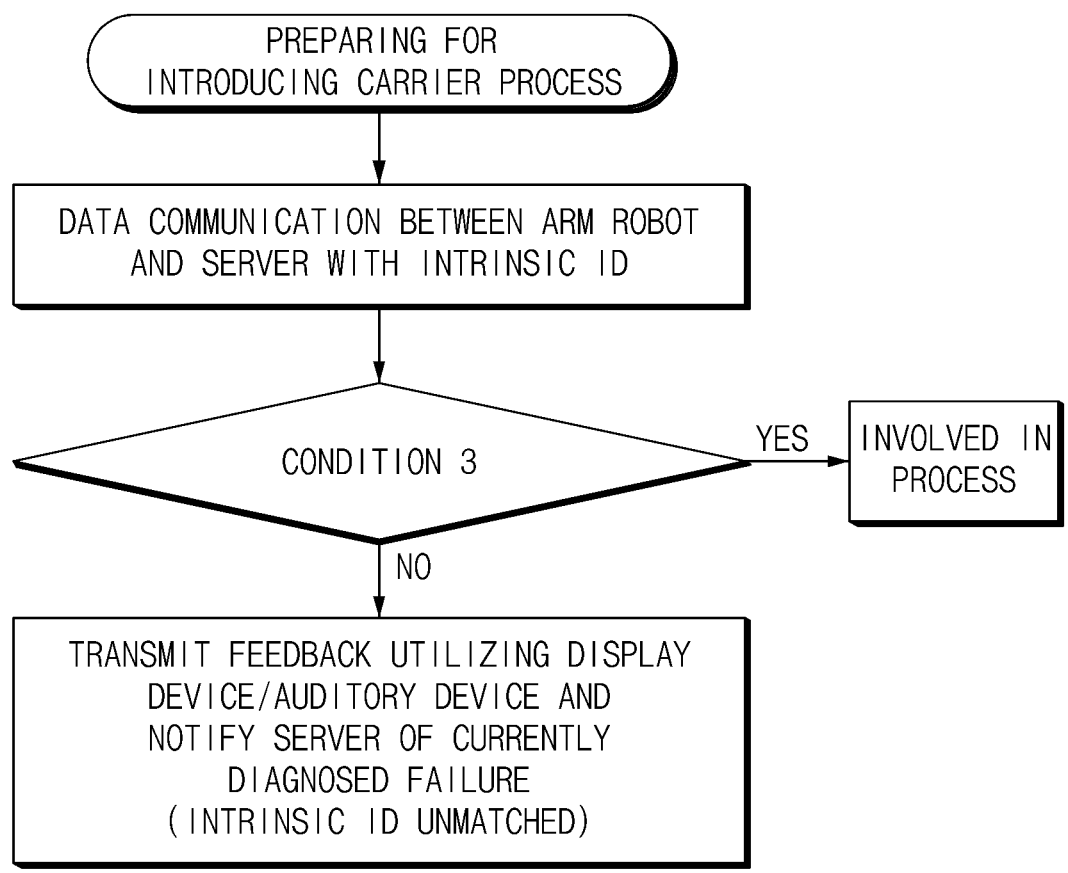
FIG. 10 is a flowchart illustrating a procedure of determining whether an arm robot is introduced, according, according to various exemplary embodiments of the present invention.

To the present end, as illustrated in FIG. 10, through the data communication of transmitting or receiving the intrinsic ID of the arm robot between the arm robot and the server, a situation corresponding to condition 3 may be determined, that is, it may be determined whether the intrinsic ID stored in the arm robot is matched with the intrinsic ID stored in the intrinsic ID DB for each carrier, which is provided in the DB of the server.

When the intrinsic IDs are matched with each other ("YES") as the determination result, the carrier is introduced into the process. When the intrinsic IDs are not matched with each other ("NO"), that the intrinsic IDs are not matched with each other is fed back to a worker in a field through a display device or an auditory device around the carrier such that the worker takes an action. Furthermore, the server may be notified with a failure diagnosis result about the situation that the intrinsic IDs are not matched with each other.

Furthermore, in the step of specifying the part, as illustrated in FIG. 8, a part (for example, a wiring, trim A, or trim B) additionally assembled in an n-th process, which is a current process, may be first detected, when compared to a (n−1)-th process, which is a previous process.

To the present end, the server may compare the previous process and the current process by utilizing data stored in a production line DB and a work instruction DB provided in the DB, and may detect the part additionally assembled in the current process. In the instant case, as described above, whether the position of the carrier passes the specific virtual point, that is, whether the time point of the photographing by the camera comes may be determined in advance.

Furthermore, in the step of specifying the part, as illustrated in FIG. 8, the position and the direction that the image data is obtained through photographing may be detected (for example, the image data may be obtained in the direction of pillar B inside the vehicle) by utilizing image data received over the communication network and stored in the image data and camera data DB of the DB provided in the server, and information on the position coordinates of the camera and the vector direction of the focus of the camera at the photographing time point for acquiring the image data.

Thereafter, in the step of specifying the part, the photographed part in the image data currently acquired may be specified by utilizing data stored in the part position information DB and a vehicle 3D modeling DB provided in the DB of the server (for example, the part to be verified in quality is specified as trim A as the determination result).

In other words, the server may compare the image data with the 3D modeling data of the vehicle, which is obtained by modeling the information on an ideal form and the position of each part of the vehicle, specifying the part to be verified in quality using the relevant image data.

In the step of verifying the quality of the assembled part, the image data is compared with the 3D modeling data of the vehicle while determining that inspection items stored in the individual part inspection item DB of the DB provided in the server are satisfied, determining whether there is present a problem in the quality of the part and the assembling process of the part.

Accordingly, as illustrated in FIG. 8, it may be determined that inspection items for each part stored in the individual part inspection item DB of the DB provided in the server are satisfied, and the result may be stored in the verification result DB.

In other words, as in condition 1 of FIG. 8, in the step of verifying the quality of the assembled part, the image data is compared with the 3D modeling data of the vehicle to determine whether there is present an item (NG item) which is not satisfied. When there is present an item which is not satisfied ("YES"), that there is present the item which is not satisfied is notified to a worker around a field through the display device or the auditory device. Furthermore, in the step of verifying the quality of the assembled part, when all inspection items are satisfied ("NO"), the carrier moves along the conveyor to perform the next process, and performs the next process.

Accordingly, before the production of the vehicle is completed, that is, right after each process is completed, it may be rapidly determined whether a problem is present in the quality of the relevant part and the quality of the assembling process. Accordingly, the following process is prevented from being performed in the status that the part causing the degradation in quality is involved.

According to various exemplary embodiments of the present invention, the image data, which is acquired by controlling the position of the multi-axis arm robot and the position of the camera during the assembling process for the vehicle, may be compared with 3D modeling data obtained by modeling the ideal form and the assembling quality of each part of the vehicle to verify the quality such that the quality in the part and the assembling process is verified in real time for each process before the vehicle is completely manufactured.

Furthermore, according, according to various exemplary embodiments of the present invention, the visual inspection, the reference of which is varied depending on persons, is minimized, and the image data is compared with the 3D modeling data of the vehicle to verify the quality, ensuring the uniform portion quality.

Furthermore, according, according to various exemplary embodiments of the present invention, the disassembling or the re-assembling of the vehicle, which is caused by the part failure or the assembling failure after the vehicle is completely assembled, may be prevented, reducing man-hour and reducing the risk of broking the part.

Furthermore, according to various exemplary embodiments of the present invention, a part assembled in a place, such as an engine compartment, which makes the visual inspection difficult, in a complete vehicle and the assembling status of the part may be monitored in real time during the assembling process of the vehicle, contributing to improving the quality of the vehicle.

Furthermore, all vehicles assembled through the production line may be verified in quality, and an action may be rapidly taken, contributing to improve the quality of the vehicle.

Besides, a variety of effects directly or indirectly understood through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for verifying quality of a part using an arm robot, the system comprising:
   the arm robot, which includes a camera to acquire image data of the part assembled in each manufacturing process of a vehicle;
   a carrier including a sliding rail allowing the arm robot to be movable around the vehicle along the sliding rail to acquire the image data; and
   a server configured to receive the image data acquired by the camera, to compare the image data with modeling data of the vehicle, which is stored in a database (DB), and to determine whether the assembled part satisfies a preset inspection item, to verify the quality of the assembled part,
   wherein the carrier further includes a hidden area formed at a front lower portion and a rear lower portion of the carrier and provided as a storage space storing the arm robot for a predetermined time period.

2. The system of claim 1, wherein the arm robot includes:
   a multi-axis arm robot to control rotation of each joint thereof,
   wherein the camera is mounted on an end portion of the arm robot.

3. The system of claim 1, wherein the carrier further includes:
   an arm robot controller configured to control driving of the arm robot moving on the sliding rail and rotation of a joint of the arm robot.

4. The system of claim 3, wherein the carrier further includes:
   a current position monitoring device configured to monitor a current position of the carrier in real time, based on data detected by at least one sliding rail sensor mounted on the sliding rail.

5. The system of claim 1, wherein the carrier further includes:
   an extending rail extending from the sliding rail surrounding the vehicle, to the hidden area.

6. The system of claim 5, wherein the carrier further includes:
   a hidden area controller to control an upper cover covering an upper portion of the hidden area to be open so that the arm robot is introduced into the hidden area, when the arm robot arrives at an end portion of the extending rail, and to control the upper cover to be closed when the arm robot is withdrawn out of the hidden area.

7. The system of claim 5, wherein the carrier further includes:
   a sliding rail sensor to detect whether the arm robot arrives at an end portion of the extending rail to be introduced into the hidden area; and
   a hidden area sensor to detect whether the arm robot is completely introduced into the hidden area or completely withdrawn out of the hidden area.

8. The system of claim 1, wherein the server include:
   an image data comparator configured to compare the image data acquired from the camera with three-dimensional (3D) modeling data of the vehicle, which is stored in the database, to specify the part to be verified in quality; and
   a quality verifying device configured to determine whether the image data of the specified part satisfies a preset inspection item.

9. The system of claim 8, wherein the server further includes:
   an arm robot position determining device configured to determine a position of the arm robot moving around the carrier in each process, to acquire image data of a part additionally assembled in each process, and to determine a position of the camera, which is adjusted, as a joint of the arm robot is controlled at the determined position.

10. The system of claim 8, wherein the server is configured to determine a relevant process as being finished and to perform a photographing operation by the camera, when determining that the carrier associated with the vehicle to be assembled passes a predetermined virtual point.

11. The system of claim 8, wherein the image data comparator is configured to receive the image data acquired by photographing the assembled part, information on position coordinates of the camera at a moment that the image data is acquired, and information on a vector direction of a focus of the camera, when receiving the image data from the camera.

12. The system of claim 8, wherein the quality verifying device is configured to set at least one inspection item in advance to verify quality of each part, to store the at least one inspection item in an individual part inspection item database (DB) of the DB provided in the server, to compare image data showing a current assembling status of the vehicle with the 3D modeling data of the vehicle, and to determine whether the at least one inspection item is satisfied.

13. A method for verifying quality of a part using an arm robot, the method comprising:
    photographing a part assembled in each process by use of a camera to acquire image data, after moving the arm robot coupled to the camera onto a sliding rail of a carrier,
    comparing, by a server having the image data received through a communication network, the image data with 3D modeling data of a vehicle, which is stored in a DB, to specify the part to be verified in quality; and
    verifying the quality of the assembled part by determining whether a preset inspection item is satisfied while comparing image data of the specified part with the 3D modeling data of the vehicles,
    wherein the carrier includes a sliding rail allowing the arm robot to be movable around the vehicle along the sliding rail to acquire the image data; and
    wherein the carrier further includes a hidden area formed at a front lower portion and a rear lower portion of the carrier and provided as a storage space storing the arm robot for a predetermined time period.

14. The method of claim 13, wherein the acquiring of the image data includes:
    performing a control operation of separating the arm robot from the sliding rail and storing the arm robot in the hidden area of the carrier for the predetermined time period; and
    controlling, by a hidden area controller, an upper cover covering an upper portion of the hidden area, to be open so that the arm robot is introduced into the hidden area, when determining that the arm robot moves to an end portion of an extending rail extending from the sliding rail to the hidden area.

15. The method of claim 14, wherein the hidden area controller is configured to control the upper cover to be closed, when the arm robot is completely introduced into the hidden area or withdrawn out of the hidden area.

16. The method of claim 13, wherein the acquiring of the image data includes:
    determining a relevant process as being finished so that the photographing by the camera is performed, when determining that the carrier associated with the vehicle to be assembled passes a preset virtual point.

17. The method of claim 13, wherein the specifying of the part includes:
    detecting a part additionally assembled in an n-th process provided as a current process, when compared to a (n−1)-th process provided as a previous process, wherein the n is a natural number greater than or equal to 2.

18. The method of claim 13, wherein the specifying of the part includes:
    detecting a position and a direction that the image data is acquired through the photographing, by utilizing the image data which is received over the communication network and stored in an image data and camera data DB of the DB provided in the server, information on position coordinates of the camera, and information on a vector direction of a focus of the camera at a photographing time point for acquiring the image data.

19. The method of claim 13, wherein the verifying of the quality of the assembled part includes:
    comparing the image data with the 3D modeling data of the vehicle while determining whether an inspection item which is not satisfied is present; and
    notifying the presence of the inspection item, which is not satisfied, to a worker around a field through a display device or an auditory device, when the inspection item, which is not satisfied, is present.

* * * * *